3,143,253
CENTER VENTED PRESSURE CONTAINER
William L. Lindgren and Magnus Lagreid, both of Sycamore, Ill., assignors to Turner Corporation, Sycamore, Ill., a corporation of Illinois
Filed Aug. 17, 1961, Ser. No. 132,155
6 Claims. (Cl. 222—396)

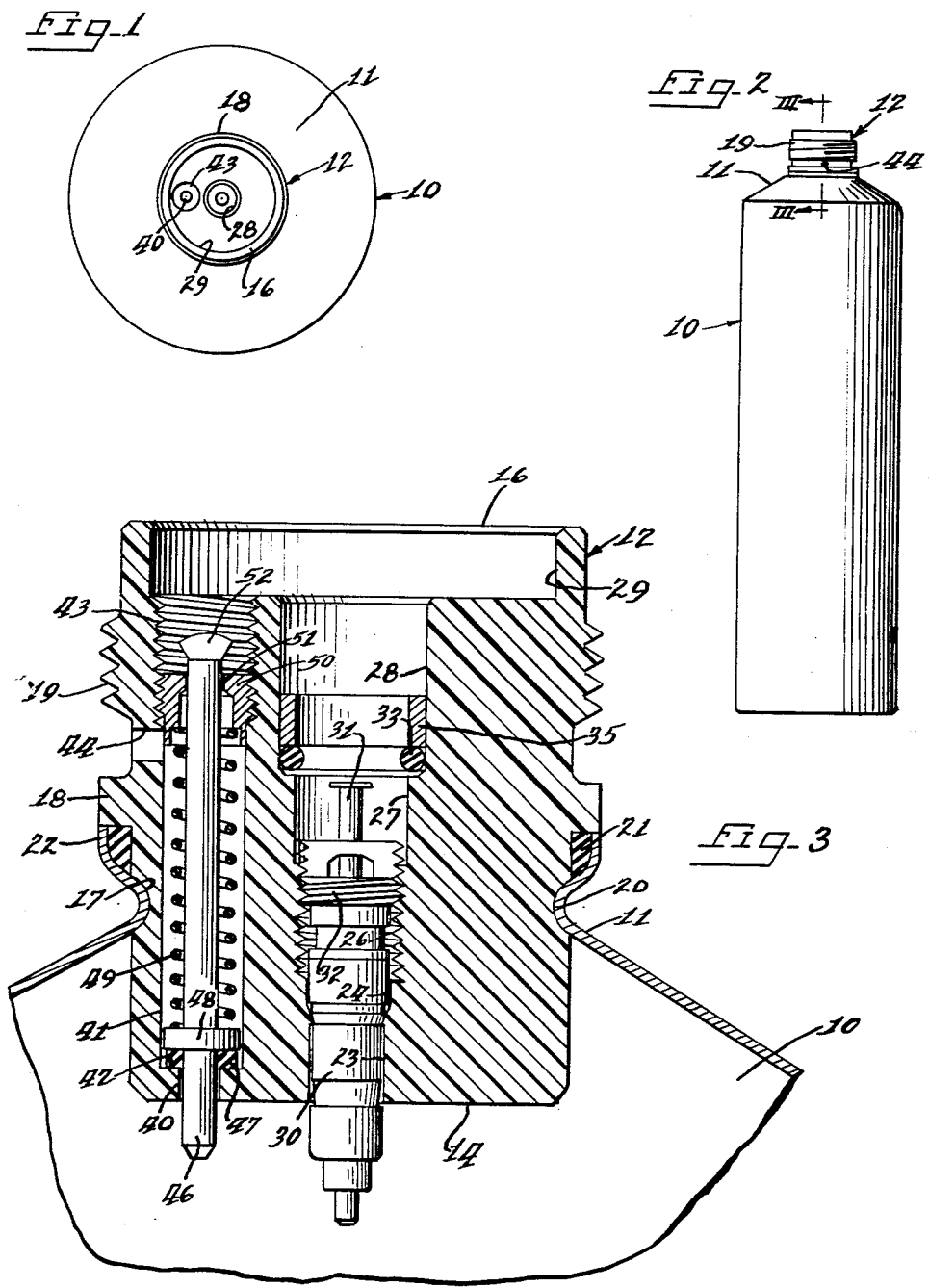

This invention relates generally to pressurized gas containers and more particularly relates to a center vented pressure container wherein the outlet fitting comprises a bushing made of a plastic material such as polyethylene placed in firm assembly with an embossed aperture of the tank by means of a mechanical joint and having one or more through openings extending axially therethrough to receive and accommodate the valve control means associated therewith.

Although the principles of the present invention are of general applicability, the present invention finds a particularly useful application to liquefied petroleum fuel tanks, for example, the popular throw-away type of liquefied petroleum fuel tank containing propane gas and which is currently popular in connection with the supply of fuel to propane gas appliances for torches as well as for heating and lighting devices.

In prior art fuel tank constructions heretofore provided, outlet fittings have been customarily incorporated into the tanks, however, such outlet fittings have comprised bushings made of metal and placed in firm assembly with the shell of the tank means by brazing, soldering or other bonding joints.

With such an assembly, testing of the valve assembly can be effected only after the completion of the entire tank. If there is a defect in the assembly, the entire tank is frequently required to be discarded as a "leaker."

Furthermore, in such prior art fuel tank constructions, the outlet fitting has only a single through opening form therein in which is placed a tire valve adapted to cooperate with the push pin of a gas appliance. In order to incorporate a pressure relief valve assembly into such a tank, a separate opening and separate relief valve construction has been provided.

In accordance with the principles of the present invention, a center vented pressure container is characterized by a single bushing made of a plastic material such as polyethylene and which is recessed on its side walls, thereby to cooperate with an embossed aperture in the shell of the tank means so the embossment may be conformably received in the recessed walls of the plastic bushing, thereby sealing the outlet fitting in the tank shell.

Additionally, the plastic bushing forming the outlet fitting in accordance with one form of the present invention has two axially extending through openings formed therein, one to receive the tire valve with the actuator stem adapted to be engaged by the push pin of a gas appliance and the other through opening receiving a poppet type safety valve. The side wall of the outlet fitting is apertured, thereby to vent gas released by the safety valve outwardly of the tank even when a gas appliance is coupled on the outlet fitting.

The valves in the fitting can be assembled, fitted and pre-tested before incorporation of the plastic bushing in the tank since all brazing is eliminated.

It is an object of the present invention, therefore, to provide an improved outlet fitting construction for a propane gas tank.

Another object of the present invention is to provide a propane tank construction wherein a plastic outlet fitting may be effectively utilized.

Yet another object of the present invention is to provide a plastic outlet fitting for a gas tank having not only a control valve therein but also a pressure relief valve.

A further object is to provide a plastic bushing for a propane gas tank which eliminates the need of brazing and which facilitates adaptability from a standpoint of tank design and fabrication.

Many other objects, advantages and additional features of the present invention will become manifested to those versed in the art upon making reference to the detailed description which follows in the accompanying sheet of drawings in which a preferred structural embodiment of a center vented pressure container is shown by way of illustrated example.

On the drawings:

FIGURE 1 is a plan elevational view of a gas tank embodying the bushing construction of the present invention.

FIGURE 2 is a side elevational view of the tank and bushing construction of FIGURE 1; and FIGURE 3 is an enlarged fragmentary cross-sectional view generally in line 3—3 of FIGURE 2.

As shown on the drawings: A pressurized fuel tank is shown at 10 and conveniently takes the form of a sheet metal shell formed by drawing or extruding into a cupped-shaped top portion having an upper centrally disposed embossment 11 in which is received a plastic bushing or outlet fitting in accordance with the principles of the present invention shown generally at 12.

The shell 10 can be constructed in any convenient manner and as noted takes the form of a sheet metal having the usual characteristics of rigidity but being sufficiently ductile to permit working thereof into special forms and shapes.

The outlet fitting 12 constitutes a bushing which in accordance with the principles of the present invention is preferably made of a plastic material of relatively flexible characteristics, for example, nylon or polyethylene or some other suitable synthetic which may be readily molded or otherwise shaped and which has the requisite characteristics of wear and chemical resistance.

The bushing 12 is generally cylindrical in configuration and has outer walls extending between two axially spaced ends shown generally at 14 and 16 respectively. Intermediate the ends 14 and 16, the outer wall of the bushing 12 is formed with an annular dished out groove or recess shown at 17.

Spaced a short distance axially from the recess or groove 17, there is a radially outwardly extending flange 18. Spaced axially from the flange 18, there is an external threaded portion shown at 19.

In association with the pressurized tank, therefore, the end 14 of the bushing 12 extends into the inside of the tank and the embossment 11 of the shell is conformably received into the recess or groove 17 as at 20, thereby locking the bushing 12 in firm assembly with the tank 10.

In practice, the conformance is readily effected by rolling the embossment 11 into the recess or groove 17. Accordingly, the shell snugly engages the adjoining plastic wall at the recess or groove 17 and not only effects a mechanical joint connection therebetween but seals the bushing 12 in the tank 10. The use of such a mechanical joint completely obviates the necessity of brazing or otherwise joining the bushing and the tank through complicated fabricating and assembling procedures.

In order to insure good sealing, a sealing member 21 is interposed between the embossment and the bushing 12. In this regard, the sealing member 21 may conveniently comprise an O-ring which is shouldered against the flange 18 and received on the peripheral surface of the bushing 12 between the flange 18 and the recess 17. In the process of rolling the embossment 11, the sealing member 21 is confined between the flange 18 and the embossment 11 thereby filling the space since the sealing member 21 can conveniently comprise a deformable sealing material such as ruber or the like. In the process of rolling or otherwise shaping the embossment 11, the end extremity of the embossment 11 can conveniently be shaped to the same diameter as the flange 18, thereby providing a continuation of the flange 18 as at 22 and closely integrating the bushing 12 with the shell of the tank 10.

In accordance with the principles of the present invention, the bushing 12 has formed therein two axially extending through openings, although it will be understood, of course, that only one through opening may be used if desired. In this regard, one of the through openings is shown at 23, the opening 23 being successively counterbored as at 24, 26, 27, 28 and 29. The counterbored portion 26 is threaded, thereby to receive in firm assembly within the through opening 23 a tire valve 30 having an actuator stem 31 positioned in the counterbored portion 27 for engagement with the push pin of either a coupling member or a gas appliance adapted to be placed in assembly with the outlet fitting or bushing 12 by threading the same on the external screw threads 19.

The tire valve 30 has an externally threaded portion 32 which threadedly engages the threaded walls of the counterbore portion 26. An O-ring sealing member 33 is received in the counterbored portion 28 for engaging against the side walls of the push pin. An O-ring retainer 35 is pressed in above the sealing member 33 to hold it in place.

The second through opening formed in the bushing 12 is shown at 40. The opening 40 is counterbored as at 41, thereby to form a valve seat 42. The counterbore 41 is threaded as at 43 and intersects the counterbore portion 29 of the first opening 23. The side walls of the bushing 12 are characterized by the formation therein of a venting aperture 44 which extends from the outside of the bushing 12 between the flange 18 and the external screw threads 19 into the counterbore 41 of the through opening 40. A valve stem 46 extends through the opening 40 and carries a washer made of sealing material 47 engaged against a shoulder 48 on the stem 46. A coil spring 49 is bottomed at one end against the shoulder 48 and is bottomed at the other end against a nut 50 externally threaded to effect screw threaded engagement with the screw threads 43. The nut is also apertured as at 51 to pass the stem 46 and the end of the stem 46 is upset as at 52 to a dimension larger than the opening 51, thereby placing the nut 50 in non-removable relationship to the stem 46.

When the nut 50 is threaded into the screw threaded portion 43 of the counterbore 41, the spring 49 normally operates to bias the valve closed with the sealing member 47 engaged against the valve seat 42. If an abnormal pressure force develops within the interior of the tank 10, the valve stem 46 will be moved against the bias of the spring 49, thereby lifting the sealing member 47 off the valve seat 42 and venting gaseous fluid through the opening 40 into the counterbore 41 whereupon the gaseous fluid will be released through the venting aperture 44. Because of the location of the venting aperture 44 on the side walls, the venting action will occur whether or not a coupling member or a gas appliance is screw threaded on to the external screw threads 19 of the outlet fitting 12.

Since the bushing can be firmly assembled in the tank with a simple mechanical joint, the valving can be conveniently assembled and pre-tested in the bushing as a completed sub-assembly, thereby eliminating "leakers" and contributing to the reduction of manufacturing cost and performance reliability.

There is thus provided in a single plastic element, both a safety valve and an actuator valve. Moreover, the outlet fitting can be placed in assembly with the tank through a mechanical operation which completely eliminates the necessity of a brazing or welding operation.

Although minor modifications might be suggested by those versed in the art, it should be understood that we wish to embody within the scope of the patent warranted hereon all such modifications as reasonably and properly come within the scope of our contribution to the art.

We claim as our invention:

1. In a tank, a shell having an outturned apertured cylindrical embossment, a bushing made of a plastic material and forming an outlet fitting in said embossment, said bushing comprising a generally cylindrical member having an intermediate outwardly projecting annular flange, said bushing having an annular recess formed in the outside walls thereof and said annular recess being spaced axially from said flange towards one end of said bushing, said one end of said bushing being received interiorly of said shell, a deformable sealing member around said bushing between said flange and said recess, said embossment having a portion offset radially inwardly to snugly and conformingly engage said bushing at said recess and having portions adjacent said offset portion which together with said flange confined said sealing member to form a sealed joint, the other end of said bushing extending outwardly of said embossment and having external screw threads formed thereon to receive a coupling means, and a through opening formed in said bushing receiving a tire valve, said tire valve having an actuator stem positioned in said through opening for cooperation with the push pin of a device adapted to be connected to the outlet fitting.

2. In a tank, a shell having an outturned apertured cylindrical embossment, a bushing made of a plastic material and forming an outlet fitting in said embossment, said bushing comprising a generally cylindrical member having an intermediate outwardly projecting annular flange, said bushing having an annular recess formed in the outside walls thereof and said annular recess being spaced axially from said flange towards one end of said bushing, said one end of said bushing being received interiorly of said shell, a deformable sealing member around said bushing between said flange and said recess, said embossment having a portion offset radially inwardly to snugly and conformingly engage said bushing at said recess and having other portions together with said flange confining said sealing member to form a sealed joint, the other end of said bushing extending outwardly of said embossment and having external screw threads formed thereon to receive a coupling means, a pair of through openings formed therein and extending axially therethrough, one of said through openings receivings a tire valve adapted to cooperate with a push pin of a device connected to the outlet fitting, the other of said through openings having a valve seat formed therein and receiving a spring loaded valve engageable with said valve seat to form a safety valve, said bushing having a venting aperture formed therein extending radially from said other of said through openings between said external screw threads and said flange to vent fluid vented by said safety valve.

3. For use in a pressurized fluid tank, an outlet fitting comprising a bushing made of flexible plastic material and having an outer peripheral annular recess, shell means made of metal and forming a neck in said tank having an embossed portion including a rib offset radially inwardly and conformably received in said recess, said outlet fitting having an axial through opening and a tire valve in said through opening having an actuator stem to be engaged by the push pin of a gas fitting, said outlet fitting having a second axial through opening formed therein, a spring loaded safety valve in said second opening, and a venting aperture in the side wall of said outlet fitting communicating with said second axial through opening to vent gaseous fluid released by said safety valve.

4. For use in a pressurized fluid tank, an outlet fitting comprising a bushing made of flexible plastic material and having an annular recess, shell means made of metal and forming a neck in said tank having an embossed portion conformably received in said recess, said outlet fitting having an axial through opening and a tire valve in said through opening having an actuator stem to be engaged by the push pin of a gas fitting, said outlet fitting having a second axial through opening formed therein, a spring loaded safety valve in said second opening, and a venting aperture in the side wall of said outlet fitting communicating with said second axial through opening to vent gaseous fluid released by said safety valve, a flange on one side of said venting aperture and a sealing ring confined between said shell means, said flange and said outlet fitting, thereby to form a sealed joint between the outlet fitting and the shell means.

5. For use in a pressurized fluid tank, an outlet fitting comprising a bushing made of flexible plastic material and having an annular recess, shell means made of metal and forming a neck in said tank having an embossed portion conformably received in said recess, said outlet fitting having an axial through opening and a tire valve in said through opening having an actuator stem to be engaged by the push pin of a gas fitting, said outlet fitting having a second axial through opening formed therein, a spring loaded safety valve in said second opening, and a venting aperture in the side wall of said outlet fitting communicating with said second axial through opening to vent gaseous fluid released by said safety valve, a flange on one side of said venting aperture and a sealing ring confined between said shell means, said flange and said outlet fitting, thereby to form a sealed joint between the outlet fitting and the shell means, and external thread means on the other side of said venting aperture to engage the coupling means of a gas appliance.

6. A liquefied petroleum tank comprising a shell formed to have an outturned apertured embossment, and a plastic valve bushing in said embossment forming an outlet fitting for said tank, said bushing being generally cylindrical in configuration and having outer walls extending between two axially spaced ends and being formed with an annular mating recess in said outer walls intermediate said axially spaced ends, said embossment and said bushing having confronting surfaces at said outer walls, said embossment being formed with a portion offset radially inwardly into said annular mating recess for projection locking said bushing into firm assembly with said tank, said bushing having an annular shoulder spaced axially from said recess, and an annular sealing means interposed between said surfaces adjacent said shoulder, said embossment confining said sealing means to form a sealed joint for preventing leakage of the contents of said tank.

References Cited in the file of this patent
UNITED STATES PATENTS

| | | |
|---|---|---|
| 2,593,770 | Kollsman | Apr. 22, 1952 |
| 2,957,611 | Sagarin | Oct. 25, 1960 |
| 2,965,271 | Soffer et al. | Dec. 20, 1960 |
| 2,973,883 | Modderno | Mar. 7, 1961 |
| 3,011,686 | Rockwell | Dec. 5, 1961 |
| 3,029,981 | Webster et al. | Apr. 17, 1962 |